(12) United States Patent
Canterberry et al.

(10) Patent No.: US 6,886,856 B2
(45) Date of Patent: May 3, 2005

(54) DUAL STAGE INFLATOR

(75) Inventors: J B Canterberry, Apollo Beach, FL (US); Donald Bowers, Tampa, FL (US)

(73) Assignee: Key Safety Systems, Inc., Sterling Heights, MI (US)

( * ) Notice: Subject to any disclaimer, the term of this patent is extended or adjusted under 35 U.S.C. 154(b) by 141 days.

(21) Appl. No.: 10/402,988

(22) Filed: Apr. 1, 2003

(65) Prior Publication Data

US 2004/0195813 A1 Oct. 7, 2004

(51) Int. Cl.⁷ .............................................. B60R 21/28
(52) U.S. Cl. ...................................... 280/741; 102/531
(58) Field of Search ................................ 280/736, 741, 280/740, 742; 102/530, 531

(56) References Cited

U.S. PATENT DOCUMENTS

| | | | | |
|---|---|---|---|---|
| 5,799,973 A | * | 9/1998 | Bauer et al. .................. | 280/736 |
| 6,095,560 A | * | 8/2000 | Perotto ........................ | 280/741 |
| 6,149,193 A | | 11/2000 | Canterberry et al. ......... | 280/741 |
| 6,328,335 B1 | * | 12/2001 | Mueller ........................ | 280/735 |
| 6,485,051 B1 | * | 11/2002 | Taguchi et al. .............. | 280/736 |
| 6,764,096 B2 | * | 7/2004 | Quioc .......................... | 280/736 |
| 2002/0135172 A1 | * | 9/2002 | Koga ........................... | 280/741 |
| 2003/0137138 A1 | * | 7/2003 | Nakashima et al. ......... | 280/741 |

FOREIGN PATENT DOCUMENTS

DE    19620758 A1  *  11/1997  ........... B60R/21/26

* cited by examiner

*Primary Examiner*—Peter C. English
(74) *Attorney, Agent, or Firm*—Lonnie Drayer

(57) ABSTRACT

An inflator for inflating an airbag has a housing with a first housing portion defining a first chamber and a second housing portion defining a second chamber. A gas generant disposed in the first and second chambers. A barrier separates the first and second chambers. Each of the chambers has an ignition enhancer tube disposed therein with a portion of an ignition unit being located therein. Each of the ignition enhancer tubes has at least one outlet defined therein. Each ignition enhancer tube holding an ignition enhancer such that when the associated ignition unit ignites the ignition enhancer combusts and exits through said outlet and then reacts with the gas generant in the associated chamber.

15 Claims, 7 Drawing Sheets

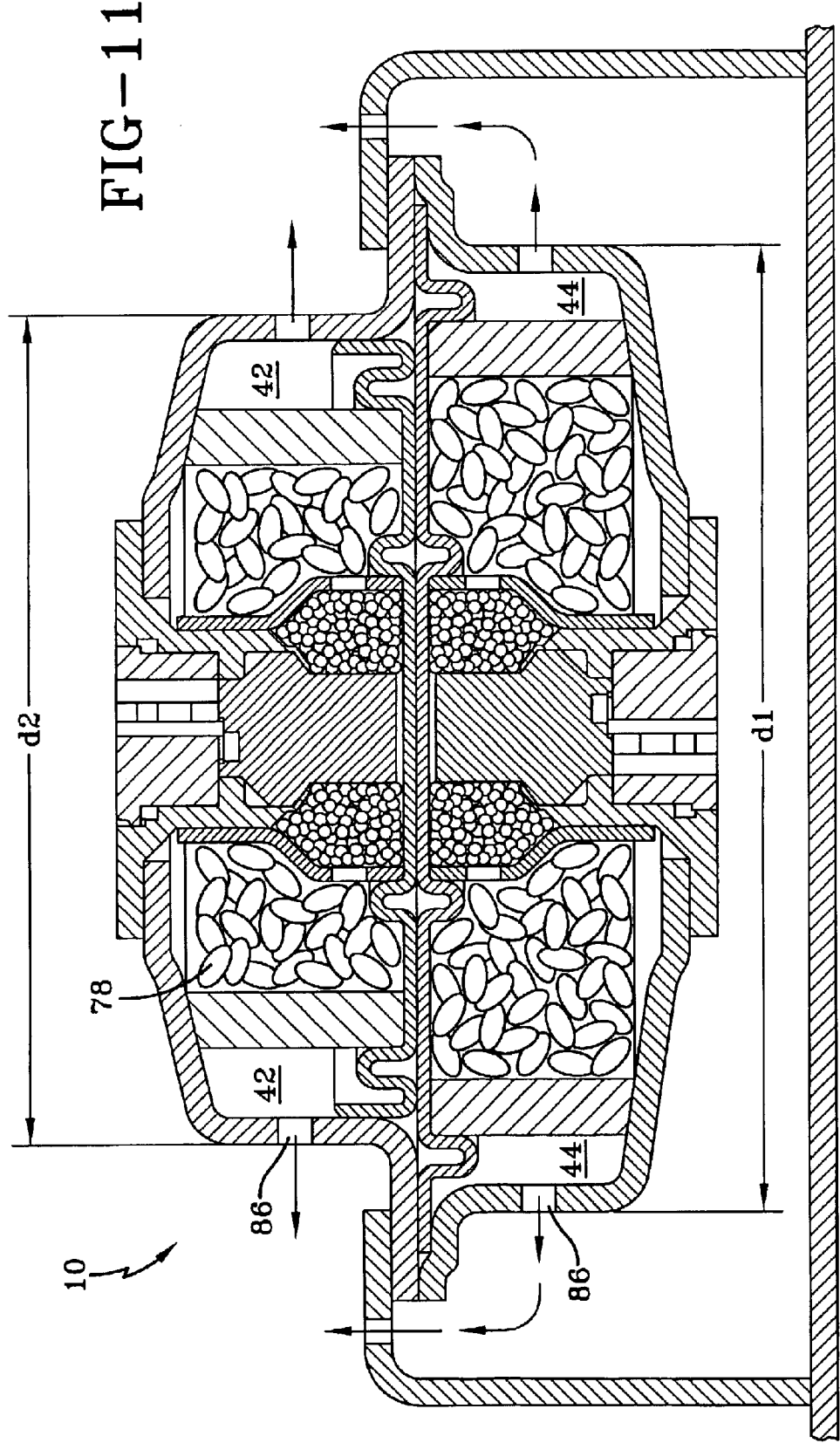

DUAL STAGE INFLATOR

FIELD OF THE INVENTION

The present invention relates to an inflator for inflating an airbag in a vehicle occupant restraint system, and more specifically for an inflator having two independent combustion chambers.

BACKGROUND OF THE INVENTION

An automotive airbag system protects vehicle occupants in crashes by rapidly inflating a cushion or bag between a vehicle occupant and the interior of the vehicle. The inflated airbag absorbs the vehicle occupant's energy to provide a gradual, controlled deceleration and provides a cushion to distribute body loads and keep the vehicle occupant from impacting the hard surfaces of the vehicle interior.

Historically, inflators have been single staged containing only one igniter, so that only one rate of inflation could be obtained. However; multi-stage inflators were developed, which had multiple igniters and allowed the rate of airbag inflation to be controlled or staged such that the airbag may be inflated at varying rates during a crash. In the prior art, single stage inflators were designed in a manner best suited for a $50^{th}$ percentile male adult. The rate of airbag inflation was predetermined. This rate of inflation or gas generation in pyrotechnic inflators is controlled by the burn rate, surface area of the gas generant and the operating pressure. For a given inflator type, the best and easiest way to control the gas generation rate is by varying generant surface area or geometry.

The most desired method of gas generation in a single stage inflator could be obtained with a progressive burning gas generant. A progressive burning generant produces gas in a progressive manner, slow at first and faster toward the end of the process. This method of gas generation would assist in moving the vehicle occupant into a desired position before the bulk of the inflating gas entered the airbag. While in theory this works, in fact it is very difficult to do as the gas generation rate is controlled by the surface area of the generant and during burning, in most cases, the surface area is decreasing. A decreasing surface area reduces the amount of gas produced and slows the rate of inflation of the airbag at a time when it is most needed. A need exists for a slow inflation rate in the beginning and a more rapid inflation rate at the end of airbag deployment.

A variable output inflator allows the crash sensing system to choose what rate of airbag inflation is best suited for the impending crash, vehicle occupant location and size.

When an energetic material is housed in close proximity to a possible "sympathetic ignition" there is a concern. This concern is present with multi stage inflators. "Sympathetic ignition" occurs when one stage or aspect of a stage multi-stage inflator is deployed and initiates the second stage. This type of event leads to uncontrolled inflation and possible device failure. A second problem is "cook-off". "Cook-off" occurs when one chamber is activated and the second is not. Heat from the activated chamber elevates the temperature of the unfired chamber to a point where activation of the second chamber occurs. A third problem associated with multi-stage inflators is a staged deployment where the second activation occurs a period of time after the first where heat from the activated chamber has raised the temperature of the unfired gas generant to a point where the gas generant functions abnormally. The problems described above are controlled in the present invention by a series of divider plates.

DISCUSSION OF THE PRIOR ART

Numerous approaches have been tried to provide more controlled airbag inflation. U.S. Pat. No. 6,149,193 discloses a variable output inflator, having a design best suited for the passenger side of a vehicle. This patent fails to suggest a multi-stage inflator that is specifically tailored for driver side use. More specifically, U.S. Pat. No. 6,149,193 does not disclose or suggest a barrier extending perpendicular to the axis of the inflator between two chambers and does not teach the geometry disclosed herein.

SUMMARY OF THE INVENTION

There is provided in accordance with one aspect of the invention an inflator for inflating an airbag comprising: a housing having an axial centerline and comprising a first housing portion with a diameter d1, said first housing portion defining a first chamber, said housing further comprising a second housing portion with a diameter d2, said second housing portion defining a second chamber; a gas generant disposed in said first and second chambers; a first ignition unit for use in combusting said gas generant disposed in said first chamber; a second ignition unit for use in combusting said gas generant disposed in said second chamber; a barrier extending perpendicular to the axis of the inflator and separating the first and second chambers; a first ignition enhancer tube disposed in said first chamber, a portion of said ignition unit being located within said first ignition enhancer tube, said first ignition enhancer tube having at least one outlet defined therein, said first ignition enhancer tube capable of holding an ignition enhancer such that when said ignition unit ignites, said ignition enhancer combusts and exits through said outlet and then reacts with said gas generant; and a second ignition enhancer tube disposed in said second chamber, a portion of said ignition unit being located within said second ignition enhancer tube, said second ignition enhancer tube having at least one outlet defined therein, said second ignition enhancer tube capable of holding an ignition enhancer such that when said ignition unit ignites, said ignition enhancer combusts and exits through said outlet and then reacts with said gas generant.

There is provided in accordance with another aspect of the invention an inflator for use in inflating an airbag comprising: a first housing portion having a first chamber defined therein; a second housing portion having a second chamber defined therein and being adjacent to said first housing portion, said first and second housing portions having a separating barrier between said first and second housing portions; a gas generant disposed in said first and second chambers; at least one gas exit port defined in said first housing portion; at least one gas exit port defined in said second housing portion; a first igniter disposed in said first chamber; a second igniter disposed in said second chamber, wherein when said first and second igniter are activated, said gas generant combusts and associated gas resulting therefrom exits said first and second housing portions via said gas exit ports to inflate an associate airbag; and an enhancer tube attached to said first housing portion and said separating wall, said enhancer tube located in the center of first chamber and defining a cavity therein to enclose said first igniter and an ignition enhancer.

There is provided in accordance with yet another aspect of the invention an inflator for an automotive airbag comprising: a first housing portion defining a first chamber, said first housing portion having a first divider plate attached thereto; a second housing portion defining a second chamber, said second housing portion having a second divider plate attached thereto, said first and second divider plates forming a separating wall between said first and second housing portions, said first divider plate comprising a main body having a circumferentially extending flange portion, inner and outer annular ribs integrally formed with said main body and forming cavities thereunder, and an circumferentially extending rim surrounding said circumferentially extending flange portion such that circumferentially extending rim contacts an interior wall of said first housing chamber during assembly, said second divider plate further comprising a main body, inner and outer annular ribs integrally formed with said main body and forming cavities thereunder, and a circumferentially extending flange portion contacting said first divider plate and said second housing portion; a maximum diameter and a height forming a ratio of Dmax/h, said ration Dmax/h ranging from substantially 1.00 to 3.00; a gas generant disposed in said first and second chambers; a first ignition unit disposed in said first chamber; and a second ignition unit disposed in said second chamber; a plurality of gas exit ports defined in said first housing portion and said second housing portion; a first filter radially spaced from said first ignition unit and disposed between said gas generant and said plurality of gas exit ports of said second housing portion; a second filter radially spaced from said second ignition unit and disposed between said gas generant and said plurality of gas exit ports of said second housing portion; a first ignition enhancer tube disposed in said first chamber, a portion of said ignition unit being located within said first ignition enhancer tube, said first ignition enhancer tube having a plurality of openings defined therein, said first ignition enhancer tube capable of holding an ignition enhancer; a second ignition enhancer tube disposed in said second chamber, a portion of said ignition unit being located within said second ignition enhancer tube, said second ignition enhancer tube having a plurality of openings defined therein, said second ignition enhancer tube capable of holding an ignition; and first and second igniters each comprising: an igniter retainer attached to a respective housing portion; and an igniter attached to said igniter retainer, wherein activation of said igniter causes said gas generant to combust, such that when said igniters ignites, said ignition enhancer combusts and exits through said plurality of openings and then reacts with said gas generant, whereby gas resulting from combustion of said gas generant is not forced to turn at angle greater than or equal to ninety degrees before exiting said plurality of gas exit ports.

BRIEF DESCRIPTION OF THE DRAWINGS

FIG. 11 is a cross-sectional view of an inflator according to an alternative embodiment of the invention.

DETAILED DESCRIPTION OF THE INVENTION

Figure 1:
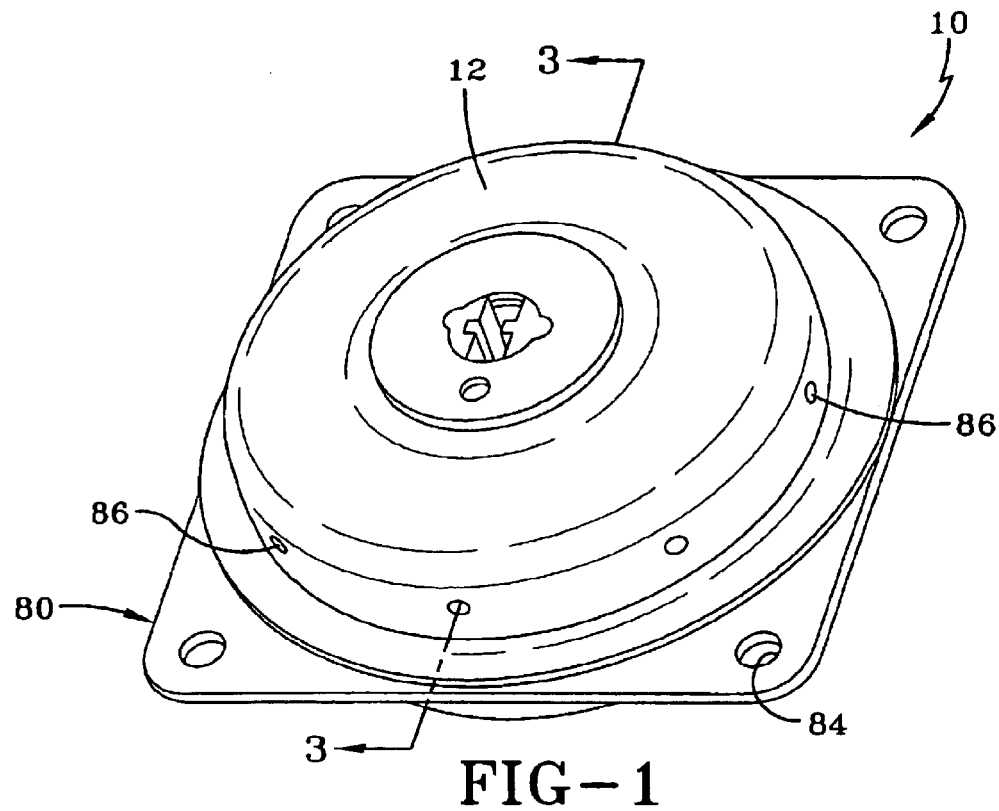
FIG. 1 is a top perspective view of an inflator according to the invention.
Figure 2:
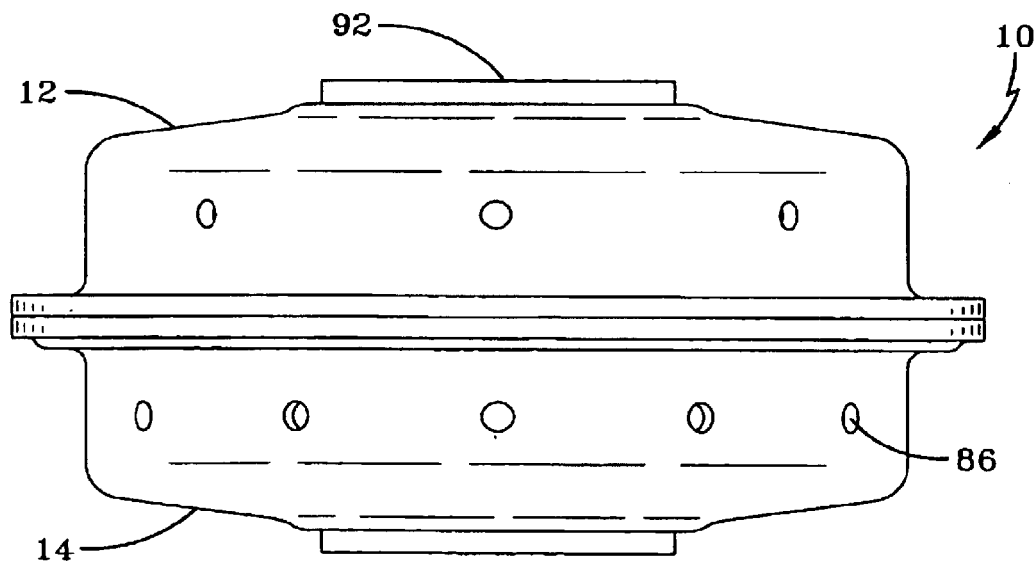
FIG. 2 is a side elevation view of the inflator shown in FIG. 1.
Figure 3:
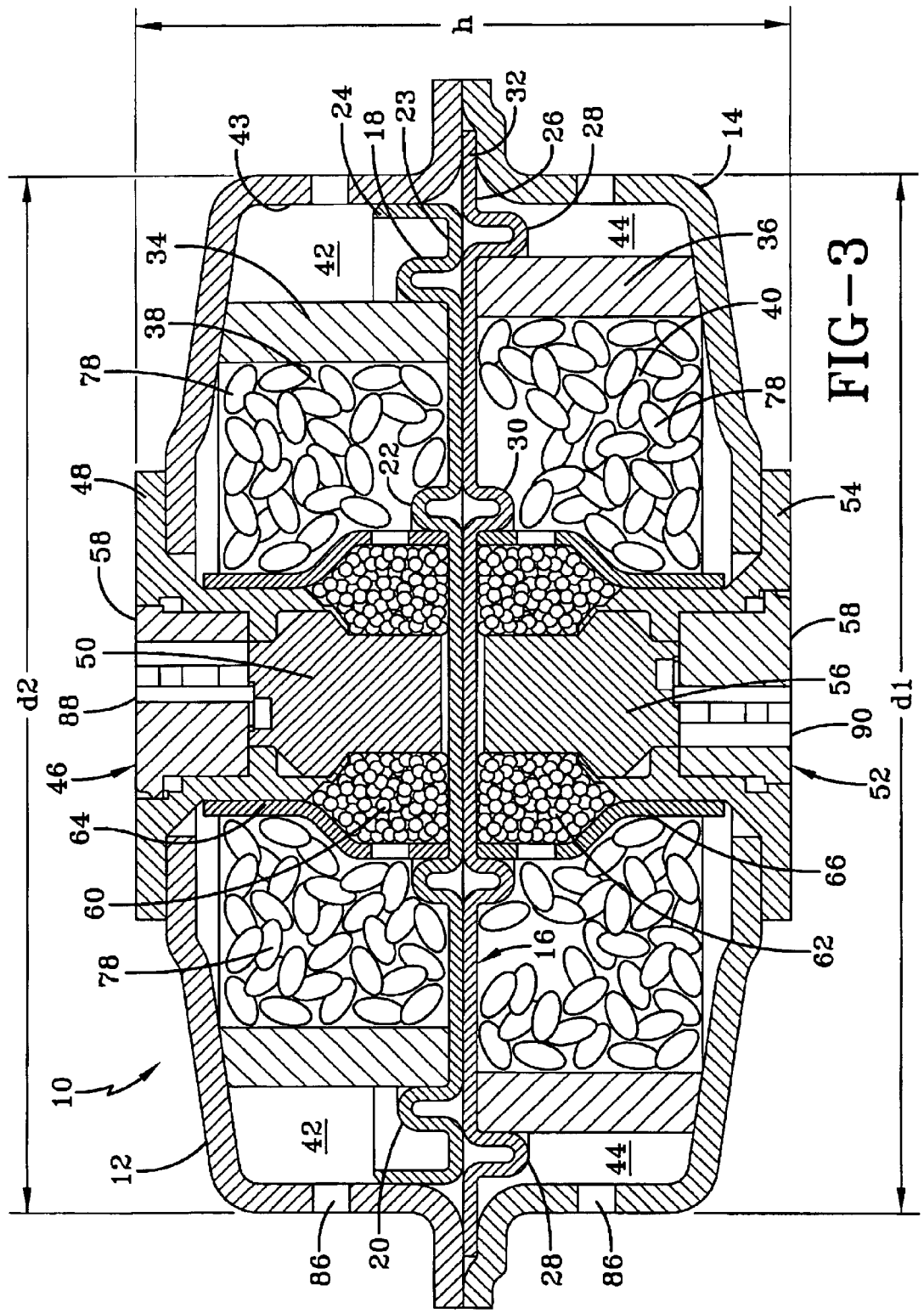
FIG. 3 is a cross-sectional view of the inflator taken along line 3—3 if FIG. 1.

Referring now to the drawings wherein the showings are for purposes of illustrating a preferred embodiment of the invention only and not for purposes of limiting the same, FIGS. 1–3 show an inflator 10 for use with an associated vehicle occupant airbag system. The embodiment illustrated is intended for use on the driver's side of an associated vehicle, and the invention is also applicable to inflators used for passenger side vehicle occupant restraint assemblies and other uses as well. The inflator 10 comprises two housing portions 12, 14. The first housing portion 14 defines a first propellant chamber 40 and the second housing portion 12 defines a second propellant chamber 38.

Figure 9:
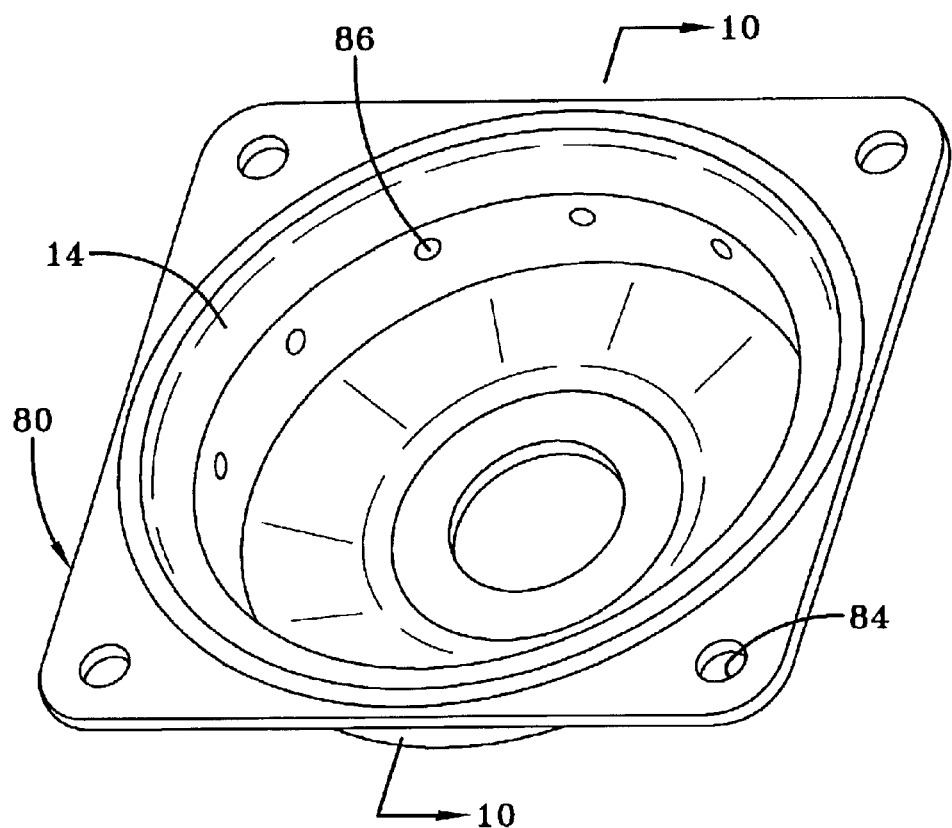
FIG. 9 is a perspective view of the first housing portion.
Figure 10:
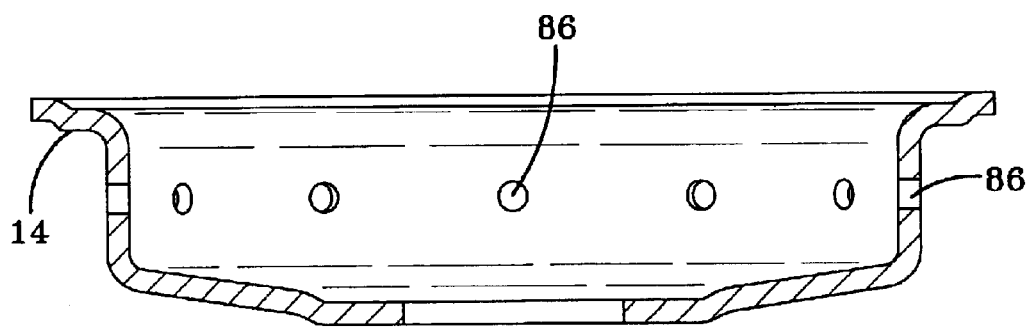
FIG. 10 is a cross sectional view of the first housing portion taken along line 10—10 of FIG. 9.

As shown in FIG. 9 the inflator 10 has a flange 80 used to attach the inflator to a vehicle. The flange 80 has a plurality of holes 84 therethrough. Fasteners, such as bolts can be inserted through the holes 84 to secure the inflator 10 and an associated airbag (not shown) to a mounting plate (not shown). Any other connecting means may be chosen to attach the inflator to the driver side of the vehicle. For example, as shown in FIG. 2, a retainer ring 92 of one of the housing portions 12, 14 may be welded or press fit onto an associated ring on a steering wheel (not shown). Regardless of what connection means is utilized with the present invention, it is preferred that all the gas generated be directed into the associated airbag rather than the vehicles interior.

In FIG. 3, which is a cross-sectional view taken at line 3—3 of FIG. 1, a gas generant 78 is disposed in the first and second propellant chambers 40, 38. A barrier 16 extends perpendicular to the axis of the inflator and to separate the first and second propellant chambers 40, 38 and preferably comprises first and second divider plates 26, 18. The barrier 16 extending perpendicular to the axis of the inflator can be any means chosen with sound engineering judgement and may even comprise a single plate (not shown) attached to the second housing portion 12 so that gas generant 78 does not spill from the second propellant chamber 38 during assembly. The first divider plate 26 is attached to the first housing portion 14, and the second divider plate 18 is attached (preferably with a snug fit) to the second housing portion 12.

Figure 5:
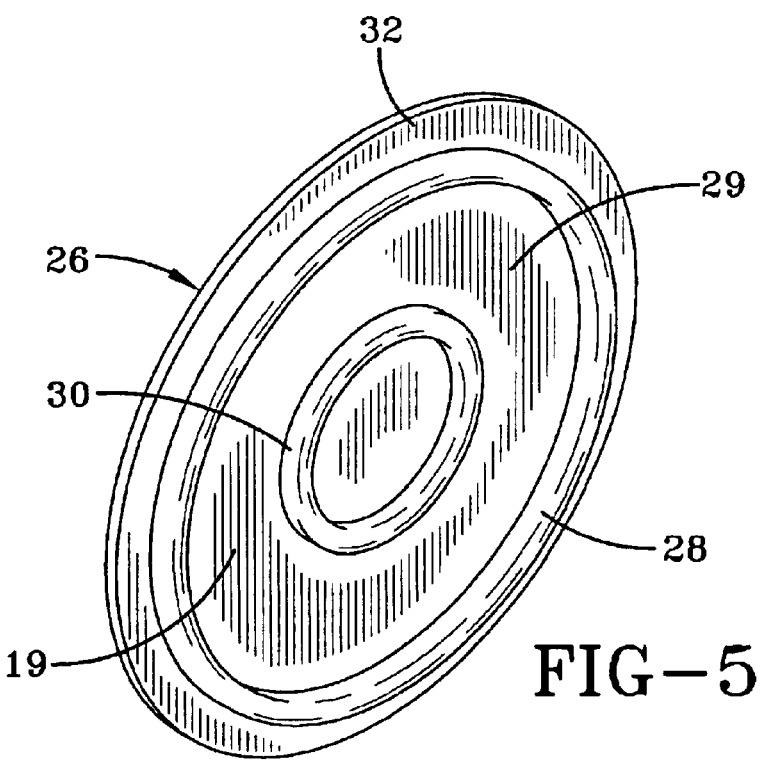
FIG. 5 is a perspective view of the first divider plate.
Figure 6:
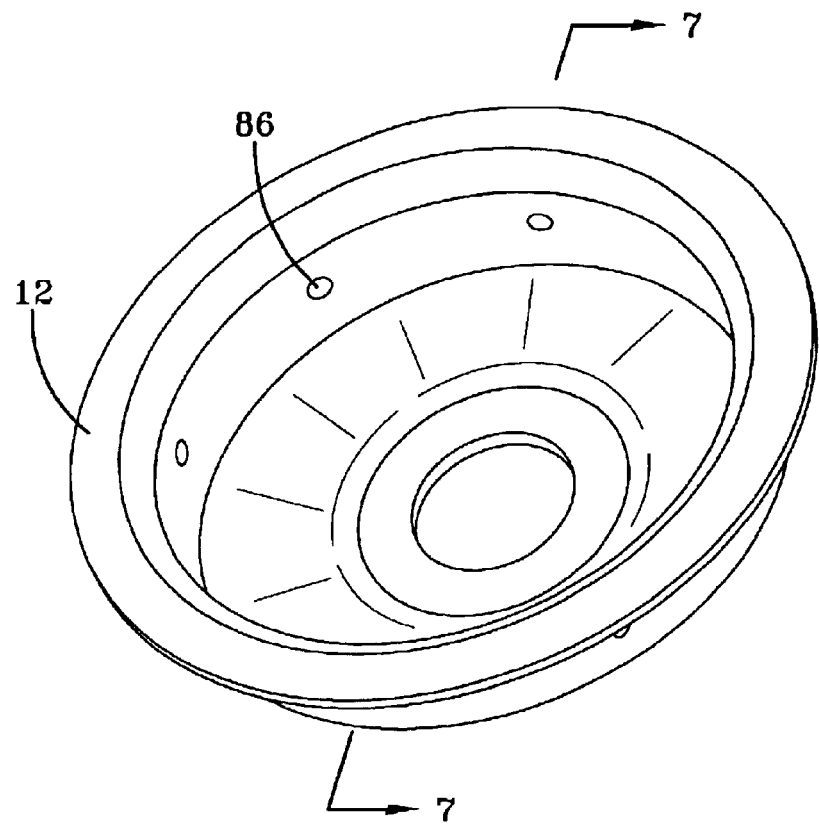
FIG. 6 is a perspective view of the second housing portion.
Figure 7:
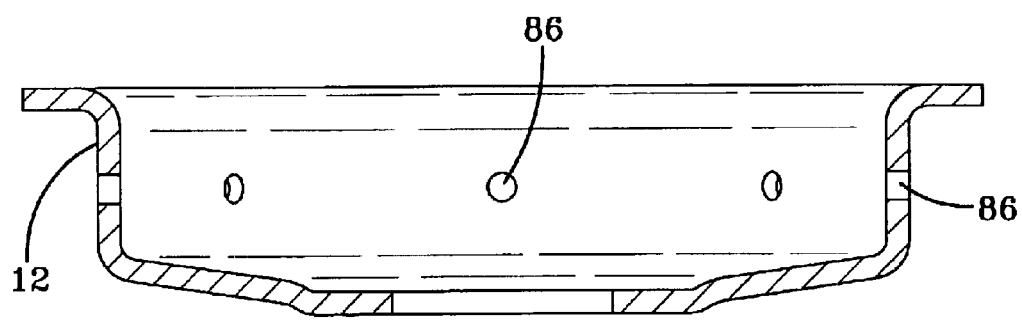
FIG. 7 is a cross-sectional view of the second housing portion taken along line 7—7 of FIG. 6.
Figure 8:
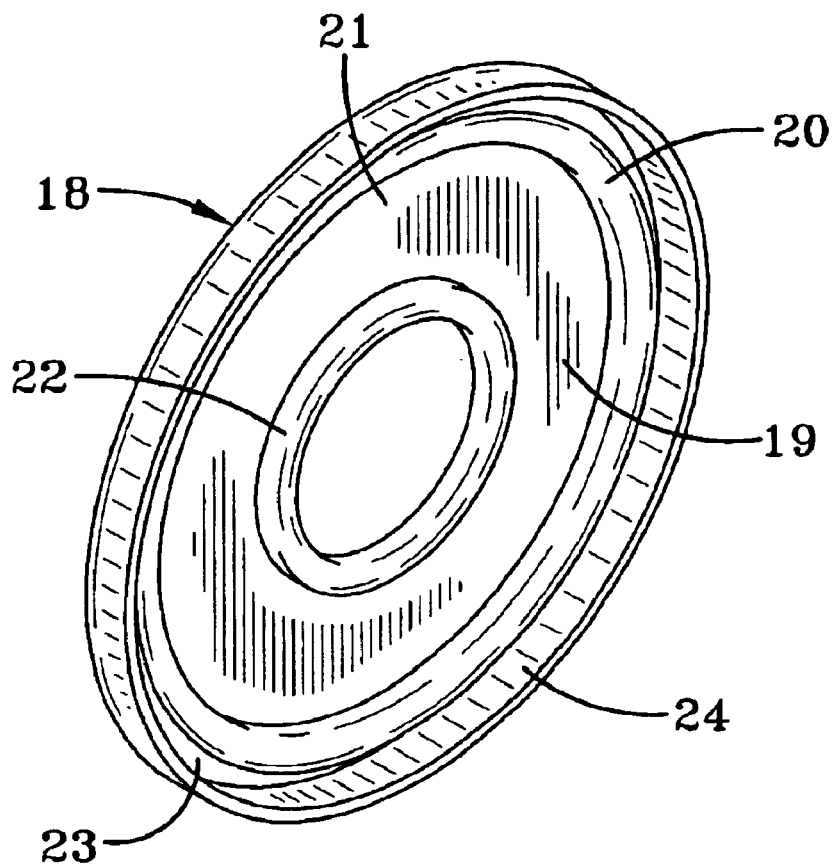
FIG. 8 is a perspective view of the second divider plate.

FIGS. 5 and 8 are perspective view of the first and second divider plates 26, 18. Each divider plate 18, 26 comprises at least two concentric annular ribs 20, 22, 28, 30 integrally formed with a main body 21, 29 of the divider plate. Cavities 19 are defined under each annular rib 20, 22, 28, 30. As shown in FIGS. 3 and 5, the first divider plate 26 has a circumferentially extending flange portion 32 that adjoins a radially outer annular rib 28. Now referring to FIGS. 3 and 8, the second divider plate 18 has a circumferentially extending rim 24 surrounding the circumferentially extending flange portion 23 of the second divider plate 18. The circumferentially extending rim 24 forms a ninety-degree angle with the circumferentially extending flange portion 23 of the second divider plate 18. During assembly when the inflator 10 is filled with a gas generant 78, the second divider plate 18 covers the gas generant and the circumferentially extending rim 24 contacts the interior wall 43 of the second propellant chamber 38 to provide a secure fit. Thus, the second housing 12 can be inverted on top of the first housing 14 during assembly of the inflator 10 without spilling the gas generant 78. As shown in FIG. 3, the radially inner annular ribs 30, 22 of the first and second divider plates 26, 18 are located the same radial distance from the centers of the divider plates 26, 18. However, the outer annular ribs 28, 20 of the first and second divider plates 26, 18 are slightly offset from one another. More specifically, the radially outer rib 28 of the first divider plate 26 has a larger diameter than the radially outer rib 20 of the second divider plate 18. This allows for a larger volume in the first propellant chamber 40 and/or a smaller volume in the first plenum chamber 44. As shown in FIG. 3, first and second filters 36, 34 are located radially inward of the radially outer annular ribs 28, 20 The radially outer annular ribs 28, 20 serve as a stop during combustion to keep the first and second filters 36, 34 in place.

As shown in FIGS. 1–3, 6, 7, 9, and 10, the inflator 10 has a plurality of gas exit ports 86 placed about the circumference of the inflator 10 and extending through the housing portions. More specifically, the plurality of gas exit ports 86 is defined in the second propellant chamber 38 and in the first propellant chamber 40.

As shown in FIG. 3, the inflator 10 has first and second igniter units 52, 46, one for the first propellant chamber 40 and one for the second propellant chamber 38. Each ignition unit 46, 52 comprises an electrical connector 88, 90, an igniter retainer 48, 54, and an igniter 50, 56. Each electrical connector 88, 90 receives an electrical signal when the inflator 10 is to be fired. The electrical connectors 90, 88 are in association with the first and second igniters 56, 50 which ignite ignition enhancers 62, 60 disposed in first and second ignition enhancer tubes 66, 64. In the event of a crash, an electronic control unit (not shown), such as but not limited to a crash sensor, delivers an electrical impulse to the selected igniter 50, 56 that lights an ignition train. This ignites the gas generant 78 disposed in the first and second propellant chambers 40, 38. The electrical connectors 88, 90 supply electrical current to the igniters 50, 56 and the igniters have an electrically resistive member that ignites the ignition enhancer 60, 62.

Figure 4:
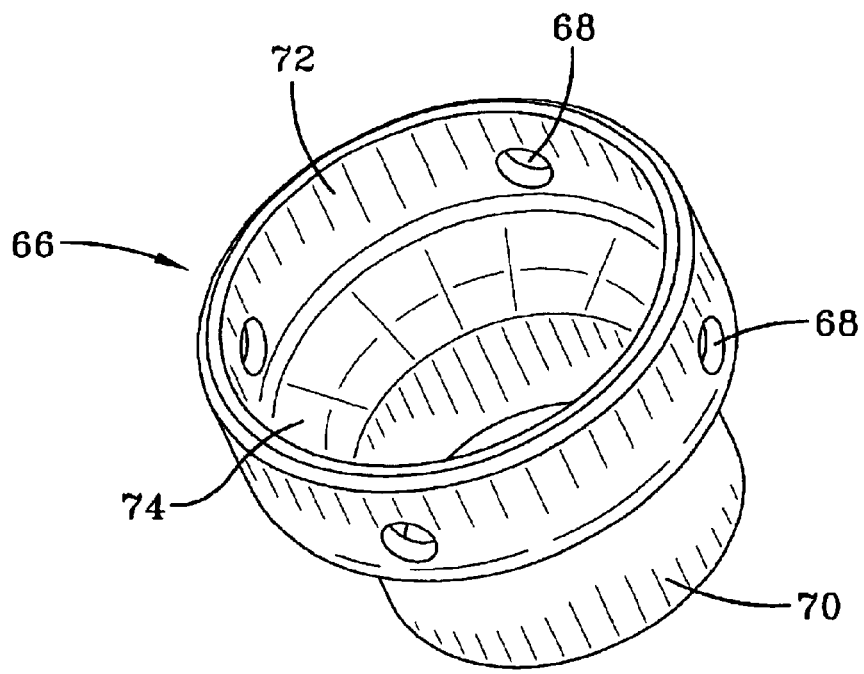
FIG. 4 is a perspective view of an ignition enhancer tube.

The ignition enhancer tubes 64, 66 are generally circular in cross section, but the shape is not limited thereto. The ignition enhancer tube 66 shown in FIG. 4 is representative of the first and second ignition enhancer tubes 66, 64 shown in FIG. 3. Each ignition enhancer tube has two tubular portions 70, 72, wherein the first tubular portion 70 is attached to the related igniter retainer 48, 54 and is smaller in diameter than the second tubular portion 72, which nests in the appropriate divider plate 18, 26. The first and second tubular portions 70, 72 are connected by a beveled wall section 74. A plurality of ignition enhancer tube outlets 68 are defined in the second tubular portion 72. As shown in FIG. 4, four outlets 68 are shown and are circumferentially spaced in approximately ninety-degree intervals. Of course, any number of ignition enhancer gas outlets 68 may be used at any interval provided the gas generant 78 is timely combusted and the airbag properly inflated. The ignition enhancers 60, 62 may be any of a number of known compositions that are readily combustible by the first and second igniters 56, 50 and burn at a high rate and temperature.

The first ignition unit 52 and said second ignition unit 46 may be activated substantially simultaneously or in a delayed time fashion. It should be understood that the term housing portion chamber includes both the propellant chambers 38, 40 and the plenum chambers 42, 44 located between the filters 34, 36 and the gas exit ports 86. The first housing portion chamber has a first volume and the second housing portion chamber has a second volume. The volume of the first housing portion chamber may be substantially equal to the volume of the second housing portion chamber, or the volume of the first housing portion chamber may not be equal to the volume of the second housing portion chamber. Depending upon the actual service requirements of the inflator 10 that may change from the vehicle to vehicle, the first propellant chamber 40 may be from 5% to 95% of the total inflator volume. In a more preferred embodiment, the first housing portion chamber 40, 44 is 50% to 80% of the total inflator volume and most preferably, the first housing portion chamber 40 may range from approximately 50% to 70% of the total inflator volume. In similar fashion, the second housing portion chamber 38, 42 may contain from 5% to 95% of the total amount of the gas generant 78 composition, more preferably from about 20% to 50% and most preferably from about 30% to about 50%. The gas generant 78 may be divided equally among the chambers or unequally, depending upon the design requirements of the inflator. These are the preferred ranges to provide variable control of airbag inflation.

As previously discussed, the combusted gases after passing through the filters 34, 36 exit the inflator 10 at the gas exit ports 86 for the first and second housings 14, 12. The interior sides of the gas exit ports 86 are preferably covered with a foil (not shown) such as aluminum or stainless steel foil to prevent the incursion of water vapor. This foil, sometimes referred to as a "burst foil" is typically of a thickness of from 0.01 millimeters to about 0.02 millimeters. The foil is typically adhered to an interior wall 43 of the plenum 42, 44 by an adhesive. The filters 34, 36 serve to reduce the temperature of the generated gas and to trap any slag or particulate matter produced during the combustion of the gas generant 78.

The gas generant 78 is ignited by the very hot gases and particles that are generated by the combustion of the ignition enhancers 60, 62, which exit the ignition enhancer gas outlets 68. The resulting ignition of the gas generant 78 results in the production of inflation gas, which passes through the filters 34, 36 and then through the plenum chambers 42, 44. In general, the gas generated upon the ignition of the gas generant 78 pass through the filters 34, 36 and proceed in a direction essentially radial from the axial centerline of the inflator. The gases proceed along this path until the combusted gas ruptures the burst foils and exits the inflator 10 through the gas exit ports 86.

The first and second igniter units 52, 46 are attached to the first and second housing portions 14, 12, respectively, through any useful means and are preferably attached via a weld. As used herein, an "igniter" is understood to be any device that will initiate the first fire in the combustion train and may be, for example, an electrical device having two electrodes insulated from one another and connected by a bridge wire. The bridge wire is preferably embedded in one or more layers of a pyrotechnic material designed to give a flash of heat of sufficient intensity to ignite the enhancer composition. The first and second igniters 56, 50 may each have an igniter shorting clip 58. The igniter shorting clip 58 grounds the igniters 56, 50 during transportation until the electrical connections are made with the igniters 56, 50. Those skilled in the art will understand that various electrical, electronic, mechanical and electromechanical initiators, such as a semi-conductor bridge initiator, can be used in the present invention.

The igniters 50, 56 are connected by electrical connectors 88, 90 to sensors (not shown) which detect when the vehicle is engaged in a crash. More specifically, the sensor activates when a predetermined threshold for deceleration is exceeded. The sensor initiates a firing signal, which activates one or both of the igniters 50, 56 which ignites the ignition enhancers 60, 62, which in turn, ignites the gas generant 78. A controller (not shown) determines which igniter 50, 56 is to fire first and the time delay, if any, between the firing of the igniters 50, 56 and therefore the two propellant chambers 38, 40.

While various forms are possible, such as cylindrical, spherical, cubic and the like, it is preferred that the inflator 10 have a generally right circular cylinder "pancake" shape as shown in FIGS. 2 and 3. Again turning to FIG. 3, the first housing portion 14 has an outside diameter d1, and the second housing portion 12 has an outside diameter d2. In the embodiment of FIG. 3 the outside diameter d1 of the first housing portion is equal to the outside diameter d2 of the second housing portion; however, in alternative embodiments, such as shown in FIG. 11, the outside diameters of the first and second housing portions may not be equal. If the inflator is intended for mounting inside of a steering wheel, the largest diameter of the inflator housing portions is preferably not greater than about 70 millimeters. If the inflator is intended for mounting inside of a steering wheel, the height h of the inflator should range from about 20 millimeters to about 44 millimeters. The exterior of the inflator has a maximum diameter and a height forming a ratio of D max/h. The ratio D max/h ranges from substantially 1.00 to 3.00, preferably substantially 2.00.

The inflator 10 can be constructed of any suitable metal such as steel or aluminum and alloys thereof. The inflator is preferably constructed of steel or a steel alloy and can be stamped or milled into the various components then assembled through the use of welds. Preferably, the welds are created by an energy beam welding process similar to that known in the industry. Referring to FIG. 2, an inflator 10 was constructed of steel using conventional techniques and equipment. Welds are placed at the junction of the various parts after filling the propellant chambers 38, 40 with pellets of a non-azide gas generant 78. Representative gas generant compositions useful in the inflator include fuels such as, but not limited to, the alkali metal azides, aminotetrazoles, tetrazoles, bitetrazoles, triazoles, the metal salts thereof, guanidine nitrate, aminoguanidine nitrate and mixtures thereof; in combination with an oxidizer such as the alkali and alkaline earth metal nitrates, chlorates, perchlorates, ammonium nitrate and mixtures thereof. A preferred gas generant comprises a mixture of a fuel and ammonium nitrate. Typically, the gas generant 78 or gas producing material can comprise about 15 to about 70 weight % fuel, about 2 to about 80 weight % oxidizer and about 1 to about 30 weight % other materials, such as coolants and processing aids. The gas generant 78 can be formed into various shapes using techniques know to those skilled in the art.

The inflator may be assembled in the following manner which is best described with reference to FIG. 3. Two subassemblies are constructed using the first and second housing portions 14, 12. Igniter retainers 48, 54 are welded to the housing portions and then shorting clips 58 are installed. The igniters 50, 56 are crimped into place. A first ignition enhancer tube 66 is press fit onto the first igniter retainer 54 such that the first igniter 56 is enclosed by the first ignition enhancer tube. A first annual filter 36 is positioned within the first housing portion 14. Then the first ignition enhancer tube 66 and the first propellant chamber 40 are filled with an ignition enhancer 62 and gas generant 78, respectively. Next, a first divider plate 26 is fitted to the first housing portion 14 to form a first subassembly. A second subassembly is assembled in a similar manner utilizing the second housing portion 12 and similar components. Once the two subassemblies are constructed, the second housing portion 12 is inverted and placed on top of the first housing portion 14. The perimeter of the first and second housing portions 14, 12 are welded together to form the inflator 10.

From the foregoing, it will be apparent to those skilled in the art that modifications may be made without departing from the spirit and scope of the invention. Accordingly, the invention is not intended to be limited except as may be made necessary by the appended claims.

What is claimed is:

1. An inflator for inflating an airbag comprising:

a housing having an axial centerline and comprising a first housing portion with a diameter d1, said first housing portion defining a first chamber, said housing further comprising a second housing portion with a diameter d2, said second housing portion defining a second chamber;

a gas generant disposed in said first and second chambers;

a first ignition unit for use in combusting said gas generant disposed in said first chamber;

a second ignition unit for use in combusting said gas generant disposed in said second chamber;

a barrier extending perpendicular to the axis of the inflator and separating the first and second chambers;

a first ignition enhancer tube disposed in said first chamber, a portion of said first ignition unit being located within said first ignition enhancer tube, said first ignition enhancer tube having at least one outlet defined therein, said first ignition enhancer tube capable of holding an ignition enhancer such that when said first ignition unit ignites, said ignition enhancer combusts and exits through said outlet and then reacts with said gas generant;

a second ignition enhancer tube disposed in said second chamber, a portion of said second ignition unit being located within said second ignition enhancer tube, said second ignition enhancer tube having at least one outlet defined therein, said second ignition enhancer tube capable of holding an ignition enhancer such that when said second ignition unit ignites, said ignition enhancer combusts and exits through said outlet and then reacts with said gas generant; and wherein said barrier extending perpendicular to the axis of the inflator has a first divider plate connected to said first housing portion and a second divider plate connected to said second housing portion, wherein said first divider plate has a main body; inner and outer annular ribs integrally formed with said main body and forming cavities thereunder; and a circumferentially extending flange portion contacting said second divider plate and said first housing portion.

2. The inflator of claim 1 further comprising: a first filter radially spaced from said first ignition unit and disposed between said gas generant and a gas exit port through said first housing portion; and a second filter radially spaced from said second ignition unit and disposed between said gas generant and a gas exit port through said second housing portion.

3. The inflator of claim 1 wherein the housing portions are sized such that diameter d1 is different than diameter d2.

4. The inflator of claim 1, wherein said first and second ignition units further comprise: an igniter retainer attached to each respective housing portion; and an igniter attached to each igniter retainer, wherein activation of each igniter causes said gas generant to combust.

5. The inflator of claim 1, wherein said first chamber has a first volume and said second chamber has a second volume such that the volume of the first chamber is substantially equal to the volume of the second chamber.

6. The inflator of claim 1, wherein said first chamber has a first volume and said second chamber has a second volume such that the volume of the second chamber is less than the volume of the first chamber.

7. The inflator of claim 6, wherein said volume of the first chamber ranges from substantially 50% to 80% of a total inflator volume.

8. The inflator of claim 7, wherein said volume of the first chamber is in the range of substantially 50% to 70% of the total inflator volume.

9. An inflator for inflating an airbag comprising:
a housing having an axial centerline and comprising a first housing portion with a diameter d1, said first housing portion defining a first chamber, said housing further comprising a second housing portion with a diameter d2, said second housing portion defining a second chamber;
a gas generant disposed in said first and second chambers;
a first ignition unit for use in combusting said gas generant disposed in said first chamber;
a second ignition unit for use in combusting said gas generant disposed in said second chamber;
a barrier extending perpendicular to the axis of the inflator and separating the first and second chambers;
a first ignition enhancer tube disposed in said first chamber, a portion of said first ignition unit being located within said first ignition enhancer tube, said first ignition enhancer tube having at least one outlet defined therein said first ignition enhancer tube capable of holding an ignition enhancer such that when said first ignition unit ignites, said ignition enhancer combusts and exits through said outlet and then reacts with said gas generant;
a second ignition enhancer tube disposed in said second chamber, a portion of said second ignition unit being located within said second ignition enhancer tube, said second ignition enhancer tube having at least one outlet defined therein, said second ignition enhancer tube capable of holding an ignition enhancer such that when said second ignition unit ignites, said ignition enhancer combusts and exits through said outlet and then reacts with said gas generant; and
wherein said barrier extending perpendicular to the axis of the inflator comprises a first divider plate connected to said first housing portion and a second divider plate connected to said second housing portion, said second divider plate having a main body having a circumferentially extending flange portion; inner and outer annular ribs integrally formed with said main body and forming cavities thereunder; and a circumferentially extending rim surrounding said circumferentially extending flange portion such that said circumferentially extending rim contacts an interior wall of said second housing portion.

10. The inflator of claim 9, further comprising a filter disposed in said first chamber between said gas generant and a gas exit port through said first housing portion.

11. The inflator of claim 9, said first chamber has a first volume and said second chamber has a second volume such that the volume of the second chamber is less than the volume of the first chamber.

12. The inflator of claim 9, wherein the exterior of the inflator has a maximum diameter Dmax and a height h forming a ratio of Dmax/h, said ratio Dmax/h within the range of substantially 1.00 to substantially 3.00.

13. The inflator of claim 12, wherein said ratio Dmax/h is substantially 2.0.

14. The inflator of claim 9, wherein said first housing portion has an exterior diameter d1, and said second housing portion has an exterior diameter d2, wherein diameter d1 is different than diameter d2.

15. An inflator for an automotive airbag comprising:
a first housing portion defining a first chamber, said first housing portion having a first divider plate attached thereto;
a second housing portion defining a second chamber, said second housing portion having a second divider plate attached thereto, said first and second divider plates forming a separating wall between said first and second housing portions, said first divider plate comprising a main body having a circumferentially extending flange portion, inner and outer annular ribs integrally formed with said main body and forming cavities thereunder, and a circumferentially extending rim surrounding said circumferentially extending flange portion such that the circumferentially extending rim contacts an interior wall of said first housing portion during assembly, said second divider plate further comprising a main body, inner and outer annular ribs integrally formed with said main body and forming cavities thereunder, and a circumferentially extending flange portion contacting said first divider plate and said second housing portion;
a maximum diameter and a height of the exterior of the inflator forming a ratio of Dmax/h, said ratio Dmax/h ranging from substantially 1.00 to 3.00;
a gas generant disposed in said first and second chambers;
a first ignition unit disposed in said first chamber;
a second ignition unit disposed in said second chamber;
a plurality of gas exit ports defined in said first housing portion and said second housing portion;
a first filter radially spaced from said first ignition unit and disposed between said gas generant and said plurality of gas exit ports of said first housing portion;
a second filter radially spaced from said second ignition unit and disposed between said gas generant and said plurality of gas exit ports of said second housing portion;
a first ignition enhancer tube disposed in said first chamber, a portion of said first ignition unit being located within said first ignition enhancer tube, said first ignition enhancer tube having a plurality of openings defined therein, said first ignition enhancer tube capable of holding an ignition enhancer;
a second ignition enhancer tube disposed in said second chamber, a portion of said second ignition unit being, located within said second ignition enhancer tube, said second ignition enhancer tube having a plurality of openings defined therein, said second ignition enhancer tube capable of holding an ignition enhancer; and
wherein said first and second ignition units each includes an igniter retainer attached to a respective housing portion and an igniter attached to said igniter retainer, wherein activation of said igniters causes said gas generant to combust, such that when said igniters ignite, said ignition enhancers combust and exit through said plurality of openings and then react with said gas generant, whereby gas resulting from combustion of said gas generant is not forced to turn at an angle greater than or equal to ninety degrees before exiting said plurality of gas exit ports.

* * * * *